(12) United States Patent
Nguyen

(10) Patent No.: US 7,036,589 B2
(45) Date of Patent: *May 2, 2006

(54) METHODS FOR FRACTURING STIMULATION

(75) Inventor: Philip D. Nguyen, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 274 days.

This patent is subject to a terminal disclaimer.

(21) Appl. No.: 10/640,763

(22) Filed: Aug. 14, 2003

(65) Prior Publication Data

US 2005/0034862 A1   Feb. 17, 2005

(51) Int. Cl.
*E21B 43/267* (2006.01)
*E21B 33/138* (2006.01)

(52) U.S. Cl. .................. 166/280.1; 166/281; 166/294; 166/295; 166/300

(58) Field of Classification Search ............. 166/280.1, 166/280.2, 281, 294, 295, 300; 507/219, 507/225, 226, 234, 903, 924; 523/131
See application file for complete search history.

(56) References Cited

U.S. PATENT DOCUMENTS

| | | | |
|---|---|---|---|
| 3,047,067 A | 7/1962 | Williams et al. | 166/33 |
| 3,176,768 A | 4/1965 | Brandt et al. | 166/33 |
| 3,722,595 A * | 3/1973 | Kiel | 166/308.4 |
| 4,042,032 A | 8/1977 | Anderson et al. | 166/276 |
| 4,785,884 A * | 11/1988 | Armbruster | 166/280.2 |
| 4,842,072 A * | 6/1989 | Friedman et al. | 166/295 |
| 5,492,178 A * | 2/1996 | Nguyen et al. | 166/276 |
| 6,306,800 B1 | 10/2001 | Samuel et al. | 507/129 |
| 6,311,773 B1 | 11/2001 | Todd et al. | 166/280 |
| 6,412,561 B1 | 7/2002 | Brown et al. | 166/308 |

FOREIGN PATENT DOCUMENTS

| | | |
|---|---|---|
| EP | 0 864 726 A2 | 9/1998 |
| EP | 1 396 606 A2 | 3/2004 |
| EP | 1 403 466 A2 | 3/2004 |

OTHER PUBLICATIONS

U.S. Appl. No. 10/444,408 filed on May 23, 2003.
Foreign Search Report and Opinion (PCT.Appl. No. GB2004/002652), Dec. 22, 2004.

* cited by examiner

*Primary Examiner*—George Suchfield
(74) *Attorney, Agent, or Firm*—Robert A. Kent; Baker Botts

(57) ABSTRACT

The present invention provides methods for fracturing and for reducing the production of both water and particulates from subterranean formations. The methods are particularly useful in conjunction with subterranean formations surrounding wellbores and fractures. The methods comprise the steps of applying to a subterranean formation gelled fluid that contains a gelling agent and a water resistant polymer, applying aqueous surfactant fluid, applying a low-viscosity consolidating fluid, and applying an after-flush fluid, and (in some embodiments) a crosslinked gel fluid.

69 Claims, No Drawings

METHODS FOR FRACTURING STIMULATION

FIELD OF THE INVENTION

The present invention relates to improved methods for fracturing formations, while stabilizing unconsolidated regions and controlling water production from subterranean formations.

DESCRIPTION OF THE PRIOR ART

Viscous fluids are often used in treating subterranean formations (such as oil or gas wells) to increase their permeability and production. It is believed that these viscous fluids do this by promoting or expanding cracks or "fractures" within the formation. These viscous fluids are called "fracturing fluids," and may be employed at various times during the life cycle of a production well. Most typically, they are introduced into a completed well's oil or gas-containing formations. They are also used in secondary or tertiary recovery operations to facilitate the injection of other fluids.

Fracturing fluids may be aqueous, or employ organic solvents. These organic solvents include any material useful to form a polymer slurry. Diesel fuel, kerosene, mixed aliphatic oils, alcohols, and alkanes are all known as solvents for these slurries.

Fracturing fluids typically contain a gelling agent. Polysaccharides like guar gum are often used as gelling agents. Guar is typically obtained as a powder, with a mesh size of about 60 to about 400. Native guar has a molecular weight of about 3,000,000. To prepare fracturing fluids, this guar may be "depolymerized," i.e., broken down into smaller polymer units, typically with a molecular weight of 25,000–400,00. The typical range of molecular weights is 100,000–250,000. This depolymerization is typically carried out before preparation of the fracturing fluid.

Guar can also be "derivatized" by reaction with a variety of chemicals. Examples of derivatized guars useful in fracturing fluids include carboxymethylguar, carboxymethylhydroxypropylgzuar, hydroxypropylguar, hydroxyethylguar, carboxymethylhydroxyethylguar, and hydroxybutylguar. Chemical reagents that are known for use in derivatizing guar include akylene oxides, haloacetic acids such as chloroacetic acid, alkali metal haloacetates, including sodium chloroacetate and sodium bromoacetate. Alkylene oxides yield hydroxyalkyl guar derivatives, while acetate agents produce carboxymethylated guar derivatives. For example, propylene oxide is used to produce hydroxypropyl guar; while chloroacetic acid or sodium bromoacetate may be used to produce carboxymethyl guar. Carboxymethylhydroxypropyl guar may be produced by sequential reaction of guar with propylene oxide and chloroacetic acid.

Viscoelastic surfactants are also used as gelling agents in these fluids. These surfactants are typically small molecules (molecular weight less than 500), and will associate under certain conditions to form micelle structures that contribute to fracturing of the formation.

Hydrocarbon wells through subterranean zones may contain unconsolidated particulates that migrate out of the subterranean formation with the oil, gas, water, and/or other fluids produced by the wells. Particulates, such as formation sand, in produced fluids may abrade pumping and other producing equipment and reduce the fluid production capabilities of the producing zones. Unconsolidated subterranean zones include those that contain loose particulates and those wherein the bonded particulates have insufficient bond strength to withstand the forces of fluids flowed through the zones.

One method of controlling particulates in unconsolidated formations involves placing a filtration bed containing gravel near the wellbore. This presents a physical barrier to the transport of unconsolidated formation fines with the production of hydrocarbons. Typically, these "gravel packing operations" include pumping and placement of a quantity of a desired particulate into the unconsolidated formation in an area adjacent a wellbore. This procedure may be time consuming and expensive.

Another method used to control particulates in unconsolidated formations consolidates the unconsolidated subterranean producing zones into hard permeable masses by applying a resin followed by a spacer fluid and then a catalyst. Such resin application may be problematic when, for example, insufficient spacer fluid is used between the application of the resin and the application of the external catalyst. The resin may contact the external catalyst in the wellbore, rather than in the unconsolidated subterranean producing zone. The external catalyst prompts an exothermic reaction of the resin, which may result in rapid polymerization, potentially damaging the formation by plugging the pore channels, halting pumping when the wellbore is plugged with solid material, or prompting down hole explosions from the heat of polymerization. Also, these conventional processes may not be useful to treat long intervals of unconsolidated regions due to the difficulty in determining if the entire interval has been successfully treated with both the resin and the external catalyst.

Often, unconsolidated formation sands migrate out of the formation when water is produced from the formation. This is due, in part, to the fact that most natural cementation between formation sand grains disintegrates when it contacts an aqueous moving phase. Water from a subterranean producing zone may mobilize formation sands, and require expensive separation and recovery, especially in light of the energy expended in producing, separating, and disposing of the water.

A variety of methods and techniques have been used to reduce the water permeability of subterranean formations. For example, one such method involves contacting the formation with a treatment solution having dissolved therein a surfactant formed of one or more fatty acid imidazolyl compounds to control the flow of water from the formation. While these methods have achieved moderate success, the treatment solutions can only be injected into the formation a short distance because as the treatment solution exits the wellbore into the subterranean formation, it attaches to adsorption sites on surfaces within the pores of the formation. Once the treatment solution is adsorbed onto the surfaces in the formation near the well bore its presence not only blocks the flow of water from the formation, it also blocks the flow of additional treatment solution deeper into the formation. This limits penetration into the formation and the water-producing zone or zones, which limits the reduction in water production achieved.

In U.S. patent application Ser. No. 10/444,408, filed May 23, 2003, I disclose compositions and methods for stabilizing subterranean formations. One embodiment comprises the steps of applying a preflush solution comprising an aqueous liquid and a water-resistant polymer to the subterranean formation, applying an aqueous liquid comprising a surfactant into the subterranean formation, applying a low-viscosity consolidating fluid to the subterranean formation, and applying an afterflush fluid to the subterranean formation. Another embodiment disclosed in that application comprises the steps of applying a preflush solution comprising an aqueous liquid and a water-resistant polymer to the subterranean formation, applying an aqueous liquid comprising a surfactant into the subterranean formation, applying a low-viscosity consolidating fluid to the subterranean formation, and applying an afterflush fluid to the subterranean formation.

SUMMARY OF THE INVENTION

The present invention provides improved methods for fracturing formations while controlling water production and sand migration in subterranean producing zones.

One embodiment of the present invention comprises the steps of applying a gelled fluid that includes a gelling agent and a water-resistant polymer to the subterranean formation, applying an aqueous liquid comprising a surfactant into the subterranean formation, applying a low-viscosity consolidating fluid to the subterranean formation, and applying an afterflush fluid to the subterranean formation.

In another embodiment, the afterflush fluid is followed by application of a crosslinked gel fluid containing proppant or a propping agent.

Other and further objects, features and advantages of the present invention will be readily apparent to those skilled in the art upon a reading of the description of preferred embodiments which follows.

DESCRIPTION OF PREFERRED EMBODIMENTS

The present invention provides improved methods for fracturing formations while controlling water production and sand migration in subterranean producing zones.

Certain embodiments of the methods of the present invention comprise successively placing into a subterranean zone a gelled fluid containing a galactomannan gelling agent (or a viscoelastic surfactant based fracturing fluid) and a water-resistant polymer, an aqueous surfactant fluid, a low-viscosity consolidating fluid, and an after-flush fluid. Each successive placement of a treatment fluid displaces the previous treatment fluid deeper into the subterranean formation.

The gelled fluid comprises an aqueous liquid, a gelling agent, and one or more water-resistant polymers. The aqueous liquid may be fresh water, salt water (e.g., water containing one or more salts dissolved therein), brine (e.g., saturated salt water), seawater, or any other aqueous liquid that does not adversely react with the other components utilized in accordance with this invention or with the subterranean formation.

The term "gelling agent," as used herein, refers to a material added to the gelled fluid to provide the viscous properties suitable for fracturing a formation. Persons of ordinary skill with the benefit of this disclosure would understand what fluid viscosities are appropriate for fracturing applications given the material specifics of the subterannean formation, the formation pressure, and other relevant properties. Examples of suitable gelling agents include hydratable galactomannans, and viscoelastic surfactants. Viscoelastic surfactants suitable for use as gelling agents are typically smaller molecules (less than 500 molecular weight) and are believed to associate to form micelles under the conditions found in the wellbore. Examples of suitable viscoelastic surfactants are disclosed in U.S. Pat. Nos. 6,412,561, and 6,306,800, both of which are incorporated by reference.

A preferred gelling agent is guar. Guar is a polysaccharide, and may be used in any form that it may practically be obtained. Most typically, guar is used as a powder. That powder preferably has a mesh size of 100–325. Derivatives of guar may also be used, including carboxymethylguar, carboxymethylhydroxypropylguar, hydroxypropylguar, hydroxyethylguar, carboxymethylhydroxyethylguar, and hydroxybutylguar, and mixtures thereof. The preparation of these guar derivatives is within the capability of those skilled in the art with the benefit of this disclosure.

Water-resistant polymers, also known as relative permeability modifiers, act, inter alia, to adsorb onto the surfaces within the pores of a formation to reduce the formation's water permeability. A variety of polymers are suitable for use as the water-resistant polymers in the present invention. Examples of particularly suitable polymers include, but are not limited to, polyacrylamide, hydrolyzed polyacrylamide, xanthan, scleroglucan, polysaccharides, amphoteric polymers made from acrylamide, acrylic acid, and diallyldimethylammonium chloride, vinyl sulfonate/vinyl amide/acrylamide terpolymers, vinyl sulfonate/acrylamide copolymers, acrylamide/acrylamido-methylpropanesulfonic acid copolymers, acrylamide/vinylpyrrolidone copolymers, sodium carboxymethyl cellulose, poly[dialkylaminoacrylate-co-acrylate-g-poly(ethyleneoxide)], acrylamide/octadecyldimethylammoniumethyl methacrylate bromide copolymer, dimethylaminoethyl methacrylate/vinyl pyrrolidone/hexadecyldimethylammoniummethyl methacrylate bromide terpolymer, acrylamide/2-acrylamido-2-methyl propane sulfonic acid/2-ethylhexyl methacrylate terpolymer, and combinations thereof.

In a preferred embodiment, the gelling agent injected with the gelled fluid is not crosslinked. Without being bound by any specific theory of operation, it is believed that the gelled fluid initiates fractures in the formation, thereby allowing the water resistant polymer, the low viscosity consolidating fluid, and the afterflush fluid (all described below) to be placed into the formation surrounding the wellbore, as well as in the fracture faces along the fracture.

Generally, at least one water-resistant polymer is included in the gelled fluid in an amount sufficient to reduce the production of water from the formation. In one embodiment, the water-resistant polymer is included in the gelled fluid in the range of from about 0.01% to about 10.0% by weight of the gelled fluid. In another embodiment, the water-resistant polymer is included in the gelled fluid in the range of from about 0.1% to about 1.0% by weight of gelled fluid. One skilled in the art, with the benefit of this disclosure, will be able to determine the amount of water-resistant polymer sufficient to reduce the production of water from the formation by the desired level.

In the methods of the present invention, after the gelled fluid has been placed in the subterranean formation, an aqueous surfactant fluid is placed in the subterranean formation. This process does not require a termination of introduction of the gelled fluid; but rather, there may be some overlap in the timing of these introductions, as, for example, when separate pumping devices are used, or when a fluid is replaced by or switched to another fluid.

The aqueous surfactant fluid comprises an aqueous liquid and a surfactant and acts, inter alia, both to displace the gelled fluid further into the formation and to prepare the subterranean formation for the later placement of a low-viscosity consolidating fluid. Generally, the volume of aqueous surfactant fluid placed into the subterranean formation is between 1 to 50 times the volume of the gelled fluid.

The aqueous liquid component of the aqueous surfactant fluid may be fresh water, salt water, brine, seawater, or any other aqueous liquid that does not adversely react with the other components utilized in accordance with this invention or with the subterranean formation. Any surfactant compatible with the later-used low-viscosity consolidating fluid and capable of facilitating the coating of the consolidating fluid on the subterranean particles and aiding the consolidating fluid in flowing to the contact points between adjacent particulates in the formation may be used in the present invention. Such surfactants include, but are not limited to, ethoxylated nonyl phenol phosphate esters, mixtures of one or more cationic surfactants, one or more non-ionic surfactants, and an alkyl phosphonate surfactant. Suitable mixtures of one or more cationic and nonionic surfactants are described in U.S. Pat. No. 6,311,773 issued to Todd et al. on Nov. 6, 2001, the disclosure of which is incorporated herein by reference. A $C_{12}$–$C_{22}$ alkyl phosphonate surfactant is preferred. The surfactant or surfactants used are included in the aqueous liquid in an amount sufficient to prepare the subterranean formation to receive a treatment of low-viscosity resin by wetting the particulates in the formation so that the resin can attach to those particulates. In some embodiments of the present invention, the aqueous surfactant fluid comprises surfactant in an amount ranging from about 0.1% to about 15% by weight of the aqueous liquid.

According to the methods of the present invention, after the aqueous surfactant fluid has been placed in the subterranean formation, a low-viscosity consolidating fluid is placed in the subterranean formation. Once again, the introduction of consolidating fluid may overlap the introduction of aqueous surfactant fluid, as in the case where separate pumping apparatus are employed.

Low-viscosity consolidating fluids suitable for use in the present invention generally comprise a hardenable resin component and a solvent component. The low-viscosity consolidating fluids of the present invention may be classified as one of four types: a two-component epoxy-based consolidation fluid comprising a hardenable resin component and a hardening agent component; a furan-based consolidation fluid; a phenolic-based consolidation fluid; or, a high-temperature ("HT") epoxy-based consolidation fluid. In certain embodiments, the low-viscosity consolidating fluid is either activated by an internal activator or by the ambient subterranean temperature such that an external catalyst is not required.

Selection of a low-viscosity consolidating fluid may be related to the temperature of the subterranean formation to which the fluid will be introduced. By way of example and not limitation, for subterranean formations having a bottom hole static temperature ("BHST") ranging from about 60° F. to about 250° F., two-component epoxy-based consolidation fluids comprising a hardenable resin component and a hardening agent component are preferred. For subterranean formations having a BHST ranging from about 300° F. to about 600° F., a one-component furan-based consolidation fluid may be preferred. For subterranean formations having a BHST from about 200° F. to about 400° F., either a one-component phenolic-based consolidation fluid or a HT epoxy-based consolidation fluid is suitable. In some cases, the furan-based and phenolic-based consolidating fluids can be applied in subterranean formations with temperatures below 200° F. by including one or more internal catalysts in the resin compositions.

Regardless of the type of low-viscosity consolidating fluid chosen, its viscosity should preferably be controlled to ensure that it is able to sufficiently penetrate the unconsolidated portions of the subterranean formation. To achieve the desired level of penetration, the consolidation fluid viscosity is preferably below about 100 cP, more preferably below about 50 cP, and most preferably below about 10 cP. Achieving the desired viscosity will generally involve either the use of a solvent or the use of heat to reduce the viscosity of the chosen resin. Factors that may influence the amount of solvent needed include the geographic location of the well and the surrounding environmental conditions. In some embodiments, suitable consolidating fluid to solvent ratios range from about 1:0.2 to about 1:20. It is within the ability of one skilled in the art, with the benefit of this disclosure, to determine a sufficient amount of a suitable solvent to achieve the desired viscosity and, thus, to achieve the preferred penetration into the subterranean formation.

One low-viscosity consolidating fluid of the present invention is a two-component epoxy-based consolidation fluid comprising a hardenable resin component and a hardening agent component. The hardenable resin component is comprised of a hardenable resin and an optional solvent. The solvent may be added to the resin to reduce its viscosity for ease of handling, mixing and transferring. It is within the ability of one skilled in the art with the benefit of this disclosure to determine if and how much solvent may be needed to achieve a viscosity suitable to the subterranean conditions. Factors that may affect this decision include geographic location of the well and the surrounding weather conditions. An alternate way to reduce the viscosity of the liquid hardenable resin is to heat it. This method avoids the use of a solvent altogether, which may be desirable in certain circumstances. The second component is the liquid hardening agent component, which is comprised of a hardening agent, a silane coupling agent, a surfactant, an optional hydrolyzable ester, and an optional liquid carrier fluid for, inter alia, reducing the viscosity of the liquid hardening agent component. It is within the ability of one skilled in the art with the benefit of this disclosure to determine if and how much liquid carrier fluid is needed to achieve a viscosity suitable to the subterranean conditions.

Examples of hardenable resins that can be utilized in the liquid hardenable resin component include, but are not limited to, organic resins such as bisphenol A-epichlorohydrin resin, polyepoxide resin, novolak resin, polyester resin, phenol-aldehyde resin, urea-aldehyde resin, furan resin, urethane resin, glycidyl ethers and mixtures thereof. Of these, bisphenol A-epichlorohydrin resin is preferred. The resin utilized is included in the liquid hardenable resin component in an amount sufficient to consolidate the coated particulates. In some embodiments of the present invention, the resin utilized is included in the liquid hardenable resin component in the range of from about 70% to about 100% by weight of the liquid hardenable resin component.

Any solvent that is compatible with the hardenable resin and achieves the desired viscosity is suitable for use in the present invention. Preferred solvents are those having high flash points (most preferably about 125° F.) because of, inter alia, environmental considerations. As described above, use of a solvent in the hardenable resin composition is optional but may be desirable to reduce the viscosity of the hardenable resin component for a variety of reasons including ease of handling, mixing, and transferring. It is within the ability of one skilled in the art with the benefit of this disclosure to determine if and how much solvent is needed to achieve a suitable viscosity. Solvents suitable for use in the present invention include, but are not limited to: butylglycidyl ether, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, methanol, butyl alcohol, d'limonene and fatty acid methyl esters. Of these, butylglucidyl ether is preferred.

Examples of the hardening agents that can be utilized in the liquid hardening agent component of the two-component consolidation fluids of the present invention include, but are not limited to, amines, aromatic amines, polyamines, aliphatic amines, cyclo-aliphatic amines, amides, polyamides, 2-ethyl-4-methyl imidazole and 1,1,3-trichlorotrifluoroacetone. Selection of a preferred hardening agent depends, in part, on the temperature of the formation in which the hardening agent will be used. By way of example and not of limitation, in subterranean formations having a temperature from about 60° F. to about 250° F., amines and cyclo-aliphatic amines such as piperidine, triethylamine, N,N-dimethylaminopyridine, benzyldimethylamine, tris(dimethylaminomethyl) phenol, and 2-($N_2$N-dimethylaminomethyl)phenol are preferred with N,N-dimethylaminopyridine most preferred. In subterranean formations having higher temperatures, 4,4-diaminodiphenyl sulfone may be a suitable hardening agent. The hardening agent utilized is included in the liquid hardening agent component in an amount sufficient to consolidate the coated particulates. In some embodiments of the present invention, the hardening agent used is included in the liquid hardenable resin component in the range of from about 40% to about 60% by weight of the liquid hardening agent component.

The silane coupling agent may be used, inter alia, as a mediator to help bond the resin to the sand surface. Examples of silane coupling agents that can be utilized in the liquid hardening agent component of the two-component consolidation fluids of the present invention include, but are not limited to, N-2-(aminoethyl)-3-aminopropyltrimethoxysilane, 3-glycidoxypropyltrimethoxysilane, and n-beta-(aminoethyl)-gamma-aminopropyl trimethoxysilane. Of these, n-beta-(aminoethyl)-gamma-aminopropyl trimethoxysilane is preferred. The silane coupling agent is included in the liquid hardening agent component in an amount capable of sufficiently bonding the resin to the particulate. In some embodiments of the present invention, the silane coupling agent is included in the liquid hardenable resin component in the range of from about 0.1% to about 3% by weight of the liquid hardening agent component.

Any surfactant compatible with the liquid hardening agent may be used in the present invention. Such surfactants include, but are not limited to, an ethoxylated nonyl phenol phosphate ester, mixtures of one or more cationic surfactants, and one or more non-ionic surfactants and an alkyl phosphonate surfactant. The mixtures of one or more cationic and nonionic surfactants are described in U.S. Pat. No. 6,311,773, issued to Todd et al. on Nov. 6, 2001, which is incorporated herein by reference. A $C_{12}$–$C_{22}$ alkyl phosphonate surfactant is preferred. The surfactant or surfactants utilized are included in the liquid hardening agent component in an amount in the range of from about 2% to about 15% by weight of the liquid hardening agent component.

Use of a diluent or liquid carrier fluid in the hardenable resin composition is optional and may reduce the viscosity of the hardenable resin component for ease of handling, mixing and transferring. It is within the ability of one skilled in the art, with the benefit of this disclosure, to determine if and how much liquid carrier fluid is needed to achieve a viscosity suitable to the subterranean conditions. Any suitable carrier fluid that is compatible with the hardenable resin and achieves the desired viscosity effects is suitable for use in the present invention. The liquid carrier fluids that can be utilized in the liquid hardening agent component of the two-component consolidation fluids of the present invention preferably include those having high flash points (most preferably above about 125° F.). Examples of liquid carrier fluids suitable for use in the present invention include, but are not limited to, dipropyleneglycol methyl ether, dipropyleneglycol dimethyl ether, dimethyl formamide, diethyleneglycol methyl ether, ethyleneglycol butyl ether, diethyleneglycol butyl ether, propylene carbonate, d'limonene and fatty acid methyl esters. Of these, diethyleneglycol methyl ether is preferred.

Where the low-viscosity consolidating fluid of the present invention is a furan-based consolidation fluid, suitable furan-based resins include, but are not limited to, furfuryl alcohol, a mixture furfuryl alcohol with an aldehyde, and a mixture of furan resin and phenolic resin. Of these, furfuryl alcohol is preferred.

The furan-based consolidating fluid may be combined with a solvent to control viscosity if desired. Suitable solvents for use in the furan-based consolidation fluids of the present invention include, but are not limited to 2-butoxy ethanol, butyl acetate, butyl lactate, and furfuryl acetate. Of these, 2-butoxy ethanol is preferred.

Where the low-viscosity consolidating fluid of the present invention is a phenolic-based consolidation fluid, suitable phenolic-based resins include, but are not limited to, terpolymers of phenol, phenolic formaldehyde resins, and a mixture of phenolic and furan resins. Of these, a mixture of phenolic and furan resins is preferred.

The phenolic-based consolidating fluid may be combined with a solvent to control viscosity if desired. Suitable solvents for use in the phenolic-based consolidation fluids of the present invention include, but are not limited to butyl acetate, butyl lactate, furfuryl acetate, and 2-butoxy ethanol. Of these, 2-butoxy ethanol is preferred.

Where the low-viscosity consolidating fluid of the present invention is an HT epoxy-based consolidation fluid, suitable HT epoxy-based components included, but are not limited to, bisphenol A-epichlorohydrin resin, polyepoxide resin, novolac resin, polyester resin, glycidyl ethers and mixtures thereof. Of these, bisphenol A-epichlorohydrin resin is preferred.

It is preferred that a solvent be used with the HT epoxy-based consolidation fluids of the present invention. Suitable solvents for use in the HT epoxy-based consolidation fluids of the present invention are those solvents capable of substantially dissolving the HT epoxy-resin chosen for use in the consolidation fluid. Such solvents include, but are not limited to, dimethyl sulfoxide, dimethyl formamide, dipropylene glycol methyl ether, dipropylene glycol dimethyl ether, diethylene glycol methyl ether, ethylene glycol butyl ether, diethylene glycol butyl ether, propylene carbonate, d'limonene and fatty acid methyl esters. Diethylene glycol methyl ether is preferred.

Following the placement of the low-viscosity consolidating fluid into the subterranean formation, an after-flush fluid is placed into the subterranean formation to displace the low-viscosity consolidating fluid from the pore channels of the subterranean formation and to force the consolidating fluid and the water-resistant polymer further into the subterranean formation. There may be some overlap in the introduction of after-flush fluid and consolidating fluid, for example, in cases where separate pumping devices are used.

The after-flush fluid is placed into the formation at a matrix flow rate such that the low-viscosity resin is displaced from the channels, but is not displaced from its desired location between the formation sand particles. Generally, the volume of after-flush fluid placed in the subterranean formation ranges from about 0.1 to about 50 times the volume of the low-viscosity resin. In some embodiments of the present invention, the volume of after-flush fluid placed in the subterranean formation ranges from about 2 to about 5 times the volume of the low-viscosity resin.

Optionally, a water-resistant polymer, as described above, may be added to the after-flush fluid. Where used, the water-resistant polymer is included in the after-flush fluid in an amount in the range of from about 0.01% to about 10.0% by weight of the aqueous liquid. In some embodiments of the present invention, the water-resistant polymer is included in the after-flush fluid in an amount of from about 0.1% to about 1.0% by weight of the aqueous liquid.

In one embodiment, a crosslinked gel fluid is injected following introduction of the after-flush brine at high pump rate sufficient to fracture the formation. The crosslinked gel fluid includes a crosslinked gelling agent. Examples include crosslinked galactomannans or viscous gels prepared from viscoelastic surfactant based fluid. A proppant is also included in the crosslinked gel fluid. There may be some overlap in the period during which these materials are introduced, especially when separate pumping systems are used.

Crosslinked galactomannan gelling agents may be prepared using the sort of galactomannan materials described above, e.g., guar and its various derivatives. Borate ion may be used for that purpose. For example, in a mixture of water and hydroxypropylguar (HPG), with HPG present in an amount of 40 lbs per thousand gallons, 3 lbs per thousand gallons of boric acid suffice to achieve the crosslinking. The crosslinking is achieved by adjusting the pH of the solution (e.g., by adding sodium hydroxide) to a range of 8.5–10.0. These gels may also be crosslinked by adding a source of polyvalent metal ions, such as titanium (IV), zirconium (IV), and chromium (III). The selection of suitable sources for polyvalent metal ions useful in crosslinking these gels is within the skill of an ordinary artisan having the benefit of this disclosure.

The crosslinked gel fluid includes a proppant. Any of a variety of conventional proppants may be used, including quartz sand grains, tempered glass beads, sintered bauxite, resin coated sand, aluminum pellets, nylon pellets, walnut hulls, light weight proppant, and similar materials. Such proppants are generally used in concentrations between about 1 to about 10 pounds per gallon of the fracturing fluid composition, but higher or lower concentrations may be used as required. The size of propping agent employed depends on the particular type of formation, pressure and pumping rates available and other factors. The selection of appropriate sizes and concentrations of proppant are within the skill of ordinary artisans having the benefit of this disclosure. Particles up to about 6 mesh on the U.S. Sieve Series scale may be used in some formations with the methods of the present invention.

Without being bound by any specific theory of operation, it is believed that the crosslinked gelled fluid aids in extending the fracture length into the formation, along with the proppant (where used). In a preferred embodiment, the proppant is coated with a hardenable resin to prevent the flowback of proppant during production of the well.

After the placement of the after-flush fluid (and/or the crosslinked gel fluid), the subterranean formation may be shut in for a period of time to allow the resin in the consolidating fluid to cure to a desired unconfined compressive strength. The necessary period of time is dependent on the low-viscosity resin used, the temperature of the formation, and the unconfined compressive strength desired. Generally, the chosen period of time will be between about 0.5 hours and about 72 hours. In some embodiments of the present invention, the chosen period of time ranges between about 6 hours and about 48 hours. Determining the proper cure time is within the ability of one skilled in the art with the benefit of this disclosure.

Therefore, the present invention is well adapted to carry out the objects and attain the ends and advantages mentioned as well as those that are inherent therein. While numerous changes may be made by those skilled in the art, such changes are encompassed within the spirit and scope of this invention as defined by the appended claims.

What is claimed is:

1. A method of stabilizing a subterranean formation comprising the steps of:
    applying a gelled solution comprising a gelling agent, an aqueous liquid, and a water-resistant polymer to the subterranean formation;
    applying an aqueous liquid comprising a surfactant into the subterranean formation;
    applying a low-viscosity consolidating fluid to the subterranean formation; and,
    applying an afterflush fluid to the subterranean formation.

2. The method of claim 1 further comprising the step of waiting a chosen period of time after applying the afterflush fluid.

3. The method of claim 2 wherein the chosen period of time is from about 6 to about 48 hours.

4. The method of claim 1 wherein the consolidating fluid has a viscosity of below about 100 cP.

5. The method of claim 1 wherein the consolidating fluid comprises a hardenable resin component comprising a hardenable resin and a hardening agent component comprising a liquid hardening agent, a silane coupling agent, and a surfactant.

6. The method of claim 5 wherein the hardenable resin in the liquid hardenable resin component comprises an organic resin selected from the group consisting of: bisphenol A-epichlorohydrin resin, polyepoxide resin, novolak resin, polyester resin, phenol-aldehyde resin, urea-aldehyde resin, furan resin, urethane resin, glycidyl ethers, and mixtures thereof.

7. The method of claim 5 further comprising a solvent for the hardenable resin in the liquid hardenable resin component.

8. The method of claim 7 wherein the solvent for the hardenable resin in the liquid hardenable resin component is selected from the group consisting of: butylglycidyl ether, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, d'limonene, fatty acid methyl esters, and mixtures thereof.

9. The method of claim 5 wherein the liquid hardening agent in the liquid hardening agent component is selected from the group consisting of: amines, aromatic amines, aliphatic amines, cyclo-aliphatic amines, piperidine, triethylamine, benzyldimethylamine, N,N-dimethylaminopyridine, 2-($N_2$N-dimethylaminomethyl)phenol, tris(dimethylaminomethyl)phenol, and mixtures thereof.

10. The method of claim 5 wherein the silane coupling agent in the liquid hardening agent component is selected from the group consisting of: N-2-(aminoethyl)-3-aminopropyltrimethoxysilane, 3-glycidoxypropyltrimethoxysilane, n-beta-(aminoethyl)-gamma-aminopropyl trimethoxysilane and mixtures thereof.

11. The method of claim 5 wherein the liquid hardening agent further comprises a hydrolyzable ester.

12. The method of claim 11 wherein the hydrolyzable ester is selected from the group consisting of: dimethylglutarate, dimethyladipate and dimethylsuccinate, sorbitol, catechol, dimethylthiolate, methyl salicylate, dimethyl salicylate, dimethylsuccinate, ter-butylhydroperoxide, and mixtures thereof.

13. The method of claim 5 wherein the surfactant in the liquid hardening agent component is selected from the group consisting of: ethoxylated nonyl phenol phosphate esters, mixtures of one or more cationic surfactants, a $C_{12}$–$C_{22}$ alkyl phosphonate surfactant, one or more non-ionic surfactants and an alkyl phosphonate surfactant, and mixtures thereof.

14. The method of claim 5 wherein the liquid hardening agent further comprises a liquid carrier fluid.

15. The method of claim 14 wherein the liquid carrier fluid is selected from the group consisting of: dipropylene glycol methyl ether, dipropylene glycol dimethyl ether, dimethyl formamide, diethyleneglycol methyl ether, ethyleneglycol butyl ether, diethyleneglycol butyl ether, propylene carbonate, d'limonene, fatty acid methyl esters and mixtures thereof.

16. The method of claim 1 wherein the consolidating fluid comprises a furan-based resin.

17. The method of claim 16 wherein the furan-based resin is selected from the group consisting of: furfuryl alcohol, a mixture furfuryl alcohol with an aldehyde, a mixture of furan resin and phenolic resin and mixtures thereof.

18. The method of claim 17 further comprising a solvent for the furan-based resin in the liquid hardenable resin component.

19. The method of claim 18 wherein the solvent is selected from the group consisting of: 2-butoxy ethanol, butyl acetate, furfuryl acetate, and mixtures thereof.

20. The method of claim 1 wherein the consolidating fluid comprises a phenolic-based resin.

21. The method of claim 20 wherein the phenolic-based resin is selected from the group consisting of: terpolymer of phenol, phenolic formaldehyde resin, a mixture of phenolic and furan resin, and mixtures thereof.

22. The method of claim 21 further comprising a solvent for the phenolic-based resin.

23. The method of claim 22 wherein the solvent is selected from the group consisting of: butyl acetate, butyl lactate, furfuryl acetate, 2-butoxy ethanol, and mixtures thereof.

24. The method of claim 1 wherein the consolidating fluid comprises a high-temperature epoxy-based resin and a solvent.

25. The method of claim 24 wherein the high-temperature epoxy-based resin is selected from the group consisting of: bisphenol A-epichlorohydrin resin, polyepoxide resin, novolac resin, polyester resin, glycidyl ethers, and mixtures thereof.

26. The method of claim 25 wherein the solvent is selected from the group consisting of: dimethyl sulfoxide, dimethyl formamide, dipropylene glycol methyl ether, dipropylene glycol dimethyl ether, dimethyl formamide, diethylene glycol methyl ether, ethylene glycol butyl ether, diethylene glycol butyl ether, propylene carbonate, d'limonene, fatty acid methyl esters, and mixtures thereof.

27. The method of claim 1 wherein the aqueous liquid in the gelled solution is selected from the group consisting of: salt water, brine, and mixtures thereof.

28. The method of claim 1 wherein the water-resistant polymer is selected from the group consisting of: polyacrylamide, hydrolyzed polyacrylamide, xanthan, scleroglucan, polysaccharides, amphoteric polymers made from acrylamide, acrylic acid, and diallyldimethylammonium chloride, vinyl sulfonate/vinyl amide/acrylamide terpolymers, vinyl sulfonate/acrylamide copolymers, acrylarnide/acrylamido-methylpropanesulfonic acid copolymers, acrylamide/vinylpyrrolidone copolymers, sodium carboxymethyl cellulose, poly[dialkylaminoacrylate-co-acrylate-g-poly (ethyleneoxide)], acrylamide/ octadecyldimethylammoniummrethyl methacrylate bromide copolymer, dimethylaminoethyl methacrylate/vinyl pyrrolidone/hexadecyldimethylammoniumethyl methacrylate bromide terpolymer, acrylamide/2-acrylamido-2-methyl propane sulfonic acid/2-ethylbexyl methacrylate terpolymer, and mixtures thereof.

29. The method of claim 1 wherein the aqueous liquid comprising a surfactant is selected from the group consisting of: salt water, brine, and mixtures thereof.

30. The method of claim 1 wherein the aqueous liquid comprising a surfactant is selected from the group consisting of: a ethoxylated nonyl phenol phosphate ester, a cationic surfactant, a non-ionic surfactant, alkyl phosphonate surfactant, and mixtures thereof.

31. The method of claim 1 wherein the afterflush fluid is a liquid that is selected from the group consisting of: salt water, brine, and mixtures thereof.

32. The method of claim 1 wherein the afterflush fluid further comprises a water-resistant polymer.

33. The method of claim 32 wherein the water-resistant polymer comprises a polymer selected from the group consisting of: polyacrylamide, hydrolyzed polyacrylamide, xanthan, scleroglucan, polysaccharides, amphoteric polymers made from acrylamide, acrylic acid, and diallyldimethylammonium chloride, vinyl sulfonate/vinyl amide/acrylamide terpolymers, vinyl sulfonate/acrylamide copolymers, acrylamide/acrylamido-methylpropanesulfonic acid copolymers, acrylamide/vinylpyrrolidone copolymers, sodium carboxymethyl cellulose, poly[dialkylaminoacrylate-co-acrylate-g-poly(ethyleneoxide)], acrylamide/ octadecyldimethylammoniummrethyl methacrylate bromide copolymer, dimethylaminoethyl methacrylate/vinyl pyrrolidone/hexadecyldimethylammoniumethyl methacrylate bromide terpolymer, acrylamide/2-acrylamido-2-methyl propane sulfonic acid/2-ethyihexyl methacrylate terpolymer, and mixtures thereof.

34. The method of claim 1, further comprising the step of applying into the subterranean formation a crosslinked gel fluid comprising a crosslinked gelling agent and a proppant.

35. A method of reducing the production of water from a subterranean formation comprising the steps of:
 applying a gelled solution comprising a gelling agent, an aqueous liquid, and a water-resistant polymer to the subterranean formation;
 applying an aqueous liquid comprising a surfactant into the subterranean formation;
 applying a low-viscosity consolidating fluid to the subterranean formation; and,
 applying an afterflush fluid to the subterranean formation.

36. The method of claim 35 further comprising the step of waiting a chosen period of time after applying the afterflush fluid.

37. The method of claim 36 wherein the chosen period of time is from about 6 to about 48 hours.

38. The method of claim 35 wherein the consolidating fluid has a viscosity of below about 100 cP.

39. The method of claim 35 wherein the consolidating fluid comprises a hardenable resin component comprising a hardenable resin and a hardening agent component comprising a liquid hardening agent, a silane coupling agent, and a surfactant.

40. The method of claim 39 wherein the hardenable resin in the liquid hardenable resin component is selected from the group consisting of: bisphenol A-epichlorohydrm resin, polyepoxide resin, novolak resin, polyester resin, phenol-aldehyde resin, urca-aldehyde resin, furan resin, urethane resin, glycidyl ethers, and mixtures thereof.

41. The method of claim 39 further comprising a solvent for the hardenable resin in the liquid hardenable resin component.

42. The method of claim 41 wherein the solvent for the hardenable resin in the liquid hardenable resin component is selected from the group consisting of: butyiglycidyl ether, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, d'limonene, fatty acid methyl esters, and mixtures thereof.

43. The method of claim 39 wherein the liquid hardening agent in the liquid hardening agent component is selected from the group consisting of: amines, aromatic amines, aliphatic amines, cyclo-aliphatic amines, piperidine, triethylamine, benzyldimethylamine, N,N-dimethylaminopyridine, 2-($N_2$N-dimethylaminomethyl)phenol, tris(dimethylaminomethyl)phenol, and mixtures thereof.

44. The method of claim 39 wherein the silane coupling agent in the liquid hardening agent component is selected from the group consisting of: N-2-(aminoethyl)-3-aminopropyltrimethoxysilane, 3-glycidoxypropyltrimethoxysilane, n-beta-(aminoethyl)-gamma-aminopropyl trimethoxysilane and mixtures thereof.

45. The method of claim 39 wherein the liquid hardening agent further comprises a hydrolyzable ester.

46. The method of claim 45 wherein the hydrolyzable ester is selected from the group consisting of: dimethylglutarate, dimethyladipate and dimethylsuccinate, sorbitol, catechol, dimethylthiolate, methyl salicylate, dimethyl salicylate, dimethylsuccinate, ter-butylhydroperoxide, and mixtures thereof.

47. The method of claim 39 wherein the surfactant in the liquid hardening agent component is selected from the group consisting of: ethoxylated nonyl phenol phosphate esters, mixtures of one or more cationic surfactants, a $C_{12}$–$C_{22}$ alkyl phosphonate surfactant, one or more non-ionic surfactants and an alkyl phosphonate surfactant, and mixtures thereof.

48. The method of claim 39 wherein the liquid hardening agent further comprises a liquid carrier fluid.

49. The method of claim 48 wherein the liquid carrier fluid is selected from the group consisting of: dipropylene glycol methyl ether, dipropylene glycol dimethyl ether, dimethyl formamide, diethyleneglycol methyl ether, ethyleneglycol butyl ether, diethyleneglycol butyl ether, propylene carbonate, d'limonene, fatty acid methyl esters and mixtures thereof.

50. The method of claim 35 wherein the consolidating fluid comprises a furan-based resin.

51. The method of claim 50 wherein the furan-based resin is selected from the group consisting of: furfuryl alcohol, a mixture furfuryl alcohol with an aldehyde, a mixture of furan resin and phenolic resin and mixtures thereof.

52. The method of claim 51 further comprising a solvent for the furan-based resin in the liquid hardenable resin component.

53. The method of claim 52 wherein the solvent is selected from the group consisting of: 2-butoxy ethanol, butyl acetate, furfuryl acetate, and mixtures thereof.

54. The method of claim 35 wherein the consolidating fluid comprises a phenolic-based resin.

55. The method of claim 54 wherein the phenolic-based resin is selected from the group consisting of: terpolymer of phenol, phenolic formaldehyde resin, a mixture of phenolic and furan resin, and mixtures thereof.

56. The method of claim 55 further comprising a solvent for the phenolic-based resin.

57. The method of claim 56 wherein the solvent is selected from the group consisting of: butyl acetate, butyl lactate, furfuryl acetate, 2-butoxy ethanol and mixtures thereof.

58. The method of claim 35 wherein the consolidating fluid comprises a high-temperature epoxy-based resin and a solvent.

59. The method of claim 58 wherein the high-temperature epoxy-based resin is selected from the group consisting of: bisphenol A-epichlorohydrin resin, polyepoxide resin, novolac resin, polyester resin, glycidyl ethers, and mixtures thereof.

60. The method of claim 59 wherein the solvent is selected from the group consisting of: dimethyl sulfoxide, dimethyl formamide, dipropylene glycol methyl ether, dipropylene glycol dimethyl ether, dimethyl formamide, diethylene glycol methyl ether, ethylene glycol butyl ether, diethylene glycol butyl ether, propylene carbonate, d'limonene, fatty acid methyl esters, and mixtures thereof.

61. The method of claim 35 wherein the aqueous liquid in the gelled solution is selected from the group consisting of: salt water, brine, and mixtures thereof.

62. The method of claim 35 wherein the water-resistant polymer is selected from the group consisting of: polyacrylamide, hydrolyzed polyacrylamide, xanthan, scleroglucan, polysaccharides, amphoteric polymers made from acrylamide, acrylic acid, and diallyldimethylammonium chloride, vinyl sulfonate/vinyl amide/acrylamide terpolymers, vinyl sulfonate/acrylamide copolymers, acrylamide/acrylamidomethylpropanesulfonic acid copolymers, acrylamide/vinylpyrrolidone copolymers, sodium carboxymethyl cellulose, poly[dialkylaminoacrylate-co-acrylate-g-poly (ethyleneoxide)], acrylamide/ octadecyldimethylammoniummrethyl methacrylate bromide copolymer, dimethylaminoethyl methacrylate/vinyl pyrrolidone/hexadecyldimethylammoniumethyl methacrylate bromide terpolymer, acrylamide/2-acrylamido-2-methyl propane sulfonic acid/2-ethylhexyl methacrylate terpolymer, and mixtures thereof.

63. The method of claim 35 wherein the aqueous liquid comprising a surfactant is selected from the group consisting of: salt water, brine, and mixtures thereof.

64. The method of claim 35 wherein the aqueous liquid comprising a surfactant is selected from the group consisting of: a ethoxylated nonyl phenol phosphate ester, a cationic surfactant, a non-ionic surfactant, alkyl phosphonate surfactant, and mixtures thereof.

65. The method of claim 35 wherein the afterflush fluid is a liquid that is selected from the group consisting of: salt water, brine, and mixtures thereof.

66. The method of claim 35 wherein the afterflush fluid further comprises a water-resistant polymer.

67. The method of claim 66 wherein the water-resistant polymer is selected from the group consisting of: polyacrylamide, hydrolyzed polyacrylamide, xanthan, scleroglucan, polysaccharides, amphoteric polymers made from acrylamide, acrylic acid, and diallyldimethylammonium chloride, vinyl sulfonate/vinyl amide/acrylamide terpolymers, vinyl sulfonate/acrylamide copolymers, acrylamide/acrylamidomethylpropanesulfonic acid copolymers, acrylamide/vinylpyrrolidone copolymers, sodium carboxymethyl cellulose, poly[dialkylaminoacrylate-co-acrylate-g-poly(ethyleneoxide)], acrylamide/octadecyldimethylammoniummrethyl methacrylate bromide copolymer, dimethylaminoethyl methacrylate/vinyl pyrrolidone/hexadecyldimethylammoniumethyl methacrylate bromide terpolymer, acrylamide/2-acrylamido-2-methyl propane sulfonic acid/2-ethylhexyl methacrylate terpolymer, and mixtures thereof.

68. The method of claim 35, wherein said proppant is coated with a hardenable resin.

69. The method of claim 35, further comprising the step of applying into the subterranean formation a crosslinked gel fluid comprising a crosslinked gelling agent and a proppant.

* * * * *